United States Patent [19]

Blevins

[11] Patent Number: 5,595,588
[45] Date of Patent: Jan. 21, 1997

[54] AIR DRYER CARTRIDGE MOUNTING SYSTEM

[75] Inventor: Jerry R. Blevins, Bloomfield Hills, Mich.

[73] Assignee: AlliedSignal Truck Brake Systems Co., Elyria, Ohio

[21] Appl. No.: 506,313

[22] Filed: Jul. 24, 1995

[51] Int. Cl.$^6$ .................................................. B01D 53/04
[52] U.S. Cl. ........................... 96/108; 96/147; 96/149; 96/151; 55/DIG. 17
[58] Field of Search ................. 55/DIG. 17; 96/108, 96/134, 135, 137, 138, 142–149, 151; 210/282, 283, 443, 444

[56] References Cited

U.S. PATENT DOCUMENTS

| | | | |
|---|---|---|---|
| 1,616,577 | 2/1927 | Janette | 210/443 X |
| 1,930,357 | 10/1933 | Heather | 96/151 X |
| 2,317,816 | 4/1943 | Scott | 34/80 X |
| 2,505,581 | 4/1950 | Unger | 96/147 X |
| 2,549,698 | 4/1951 | Mason | 210/282 X |
| 2,630,228 | 3/1953 | Wright et al. | 210/443 X |
| 2,980,257 | 4/1961 | Paton | 210/444 X |
| 3,353,339 | 11/1967 | Walter | 96/137 |
| 3,464,186 | 9/1969 | Hankison et al. | 96/137 X |
| 3,475,885 | 11/1969 | Kline | 96/147 |
| 3,655,906 | 5/1972 | De Palma | 96/147 X |
| 3,680,283 | 8/1972 | Jones, Jr. | 55/DIG. 17 |
| 3,796,025 | 3/1974 | Kasten | 55/419 X |
| 4,071,337 | 1/1978 | Evans | 55/DIG. 17 |
| 4,131,442 | 12/1978 | Frantz | 96/137 |
| 4,385,913 | 5/1983 | Lane | 55/484 X |
| 4,505,727 | 3/1985 | Cullen et al. | 96/147 |
| 4,713,094 | 12/1987 | Yanagawa et al. | 55/163 |
| 4,714,483 | 12/1987 | Koening et al. | 96/144 X |
| 4,755,196 | 7/1988 | Frania et al. | 96/144 X |
| 5,002,593 | 3/1991 | Ichishita et al. | 96/137 |
| 5,053,129 | 10/1991 | Kitson | 210/443 X |
| 5,110,327 | 5/1992 | Smith | 96/144 X |
| 5,186,522 | 2/1993 | Spencer | 96/137 X |
| 5,209,764 | 5/1993 | Eberling | 96/137 X |
| 5,286,283 | 2/1994 | Goodell | 96/135 X |
| 5,403,387 | 4/1995 | Flynn et al. | 96/143 |
| 5,427,609 | 6/1995 | Zoglman et al. | 96/135 X |

FOREIGN PATENT DOCUMENTS 4-322717  11/1992  Japan ........................ 96/143

OTHER PUBLICATIONS

Service Data—AD-9 Air Dryer, Nov. 1992, SD-08-2412, Bendix Heavy Vehicle Systems.

Primary Examiner—Robert Spitzer
Attorney, Agent, or Firm—Howard G. Massung; Gus T. Hampilos

[57] ABSTRACT

A desiccant type air dryer for an air supply system for a motor vehicle brake system. The air dryer incorporates features for convenient mounting and dismounting of a desiccant cartridge to the air dryer body assembly. This connection is achieved through the use of an externally accessible through bolt which passes through the body assembly and engages a central threaded boss on the load plate of the desiccant cartridge. Interlocking engagement between the desiccant cartridge and body assembly prevent these parts from rotating relative to one another during mounting and dismounting of the cartridge. The desiccant cartridge is readily removed through engaging the through bolt driving head using conventional tools.

7 Claims, 2 Drawing Sheets

AIR DRYER CARTRIDGE MOUNTING SYSTEM

BACKGROUND OF THE INVENTION

This invention relates to a component for a motor vehicle air brake system, and particularly, to an air dryer assembly.

Many motor vehicles, and in particular, heavy duty trucks incorporate air brake systems which use air pressure to control application of the vehicle service brakes. These systems have an air compressor driven by the vehicle engine which charges a brake system reservoir with high pressure air. The air compressor is controlled to supply air intermittently as needed to replenish the reservoir and maintain reservoir pressure within a predetermined range.

The process of compression of air results in the precipitation of water. Water and particulates in the air brake system can lead to component deterioration and interfere with optimal operation of the brake system. Accordingly, there are various devices used for removing water from the compressed air in air brake systems, known as air dryers. The function of an air dryer is to collect and remove air system contaminants in solid, liquid and vapor form before they enter the brake system. The air dryer provides clean, dry air for the components of the brake system which increases the life of the system and reduces maintenance costs. One type of air dryer incorporates a desiccant material which eliminates daily manual draining of water collection reservoirs as is required in other types of air dryers.

Desiccant type air dryers employ a volume of desiccant material which is hydrophilic and thus absorbs water which passes through an air line from the air compressor. High pressure air enters the desiccant air dryer and the water is stripped by the desiccant material. The air dryer also includes a particulate filter for trapping particulates and oil. Eventually, the desiccant material absorbs water to its maximum capacity. As a means of expelling this trapped water, modern desiccant type air dryers incorporate a backflow or purge air flow as a means of stripping the desiccant of absorbed water. A reservoir referred to as a purge volume is provided with is charged with the high pressure air supplied by the compressor. When the compressor cycles from a loaded mode producing compressed air to the unloaded mode, the purge volume air is allowed to leak to atmosphere through the desiccant bed in a reverse flow direction, stripping it of moisture and expelling it into the air. External purge volume air dryer types use a purge volume reservoir separate from the air dryer and connected to it by an air line. Another type is a so-called integral purge volume type in which the housing which contains a desiccant material also defines the purge volume. These types are in widespread use today and provide excellent performance.

In modern desiccant type air dryers some means of removing the desiccant material is provided since it requires rejuvenation after a service life period. In use, the desiccant material absorbs contaminants such as oil which ultimately reduces its water retention characteristics. Since other components of air dryers have a long service life, a convenient system for removing the desiccant material is desired. In one type of air dryer, spin-on type desiccant cartridges are used. The desiccant cartridge resembles a conventional motor vehicle spin-on oil filter in a form of a canister with a load plate having a centrally threaded bore such that the entire unit is threaded onto an upstanding boss on a mounting surface. In some installations, this type of air dryer has a significant disadvantage; namely, that access to the cartridge is severely restricted due to the confined areas where the air dryer is mounted. This confinement makes it difficult to engage the desiccant cartridge using removal tools such as the band type wrenches typically used. Other types of air dryers require substantial disassembly to access the desiccant material. These types increase maintenance time and therefore, costs.

In view of the foregoing, there is need to provide an air dryer having an improved desiccant cartridge attachment system which allows convenient mounting and removal of the desiccant cartridge, with reduced access requirements.

SUMMARY OF THE INVENTION

In accordance with the present invention an air dryer is provided in which the removable desiccant cartridge is mounted in place by a through bolt passing through the air dryer body assembly and threading into a centrally disposed threaded bore in the desiccant cartridge. The retention bolt is accessible from the exposed bottom of the body assembly which is generally unobstructed since clearance must be present for a number of air lines to be connected to that part of the device. Interlocking engagement between the desiccant cartridge and body assembly prevents these two components from rotating relative from one another during the process of mounting and dismounting the cartridge.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
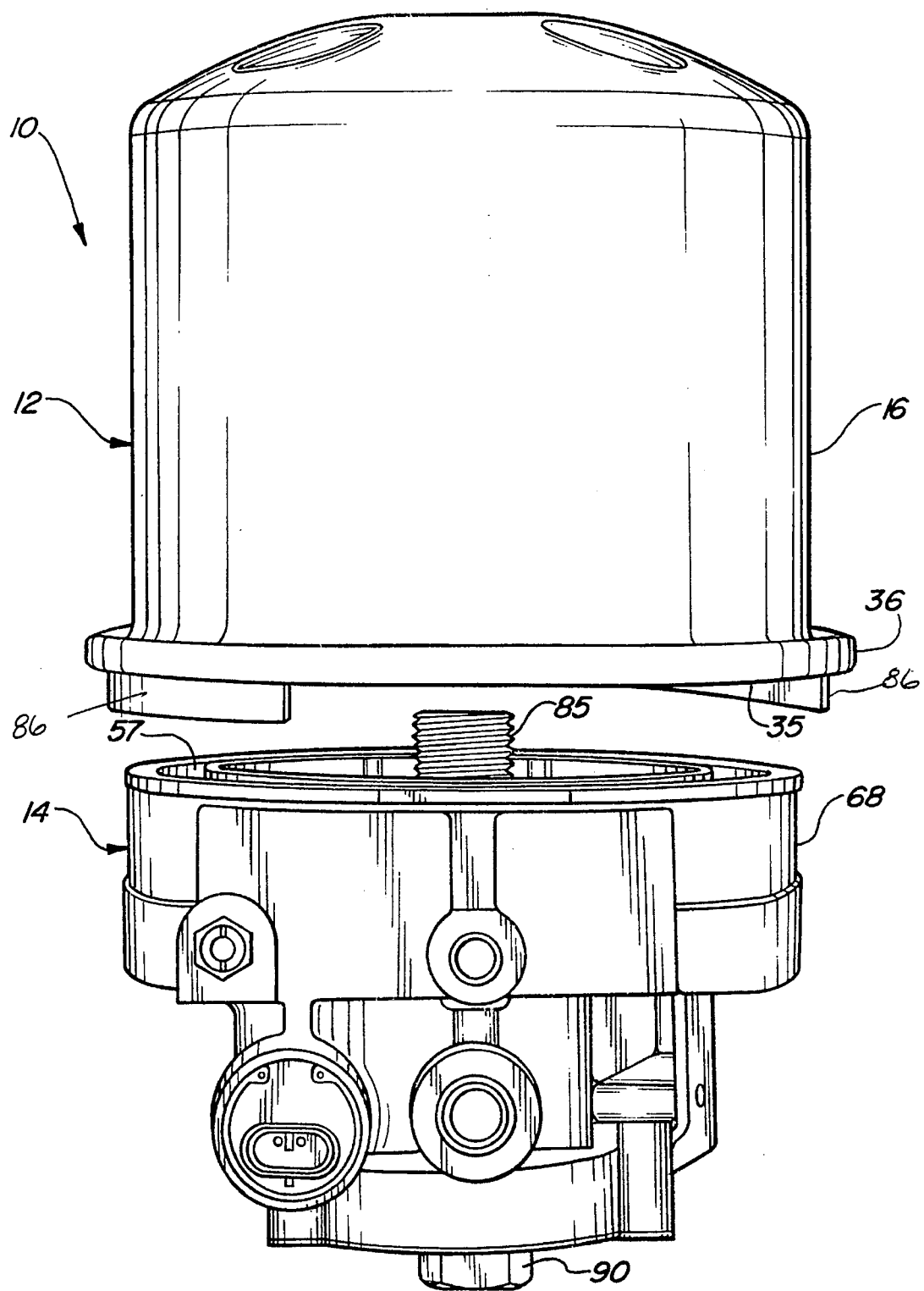
FIG. 1 is an exploded elevational view of an air dryer in accordance with the present invention.
Figure 2:
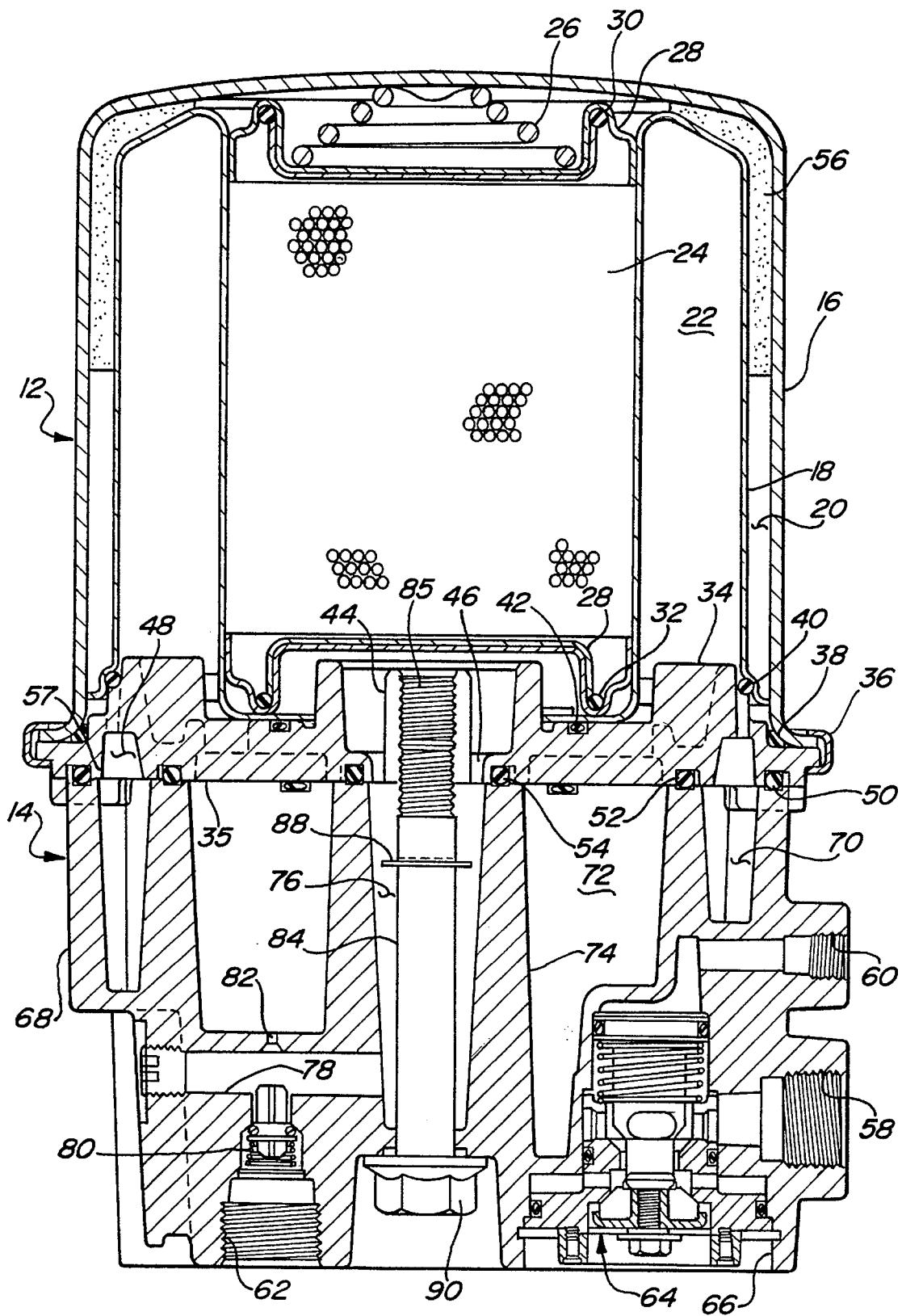
FIG. 2 is a cross-sectional view through the air dryer of FIG. 1 showing the air dryer assembled and internal components of the device.

An air dryer in accordance with the present invention is shown in FIGS. 1 and 2 and is generally designated by reference number 10. Air dryer 10 is particularly suited for use in an air supply system for motor vehicle air brakes, such as found in heavy duty trucks. Air dryer 10 principally comprises two detachable components; namely, desiccant cartridge 12 and body assembly 14.

Details of the construction of desiccant cartridge 12 are best described with reference to FIG. 2. Cartridge 12 has a drawn sheet metal cup-shaped outer shell 16. Double-wall inner sleeve 18 is disposed within outer shell 16 and defines a radial clearance passageway 20 around its outer perimeter, and further defines an annular interior cavity 22. Disposed within the inside cylindrical surface of inner sleeve 18 is desiccant bed 24. Desiccant bed 24 is comprised of a bead like granular material which has hydrophilic properties. The material comprising desiccant bed 24 is compressed by spring 26 and is retained by cloth sack 28 covering the upper and lower ends of the desiccant bed. Cloth sack 28 is maintained in position by O-rings 30 and 32. Spring 26 maintains desiccant bed 24 in a densely packed condition for optimal performance.

Air dryer cartridge outer shell 16 and inner sleeve 18 are affixed to load plate 34. As shown, outer shell 16 is affixed to load plate 34 by a rolled perimeter band 36. Load plate 34 has a bottom mounting surface 35 for mating with body assembly 14. O-rings 38, 40 and 42 are used to provide isolated volumes within cartridge 12, as will be described in greater detail below. At the center of load plate 34 is internally threaded boss 44. Apertures around boss 44 create a flow passageway 46. An outer groove 48 in the bottom surface of load plate 34 communicates with cartridge outer passageway 20 through internal passagways (not shown). O-rings 50, 52 and 54 are positioned within concentric grooves on the bottom surface of load plate 34 for sealing engagement with features of body assembly 14, as will be described in greater detail as follows. Porous filter 56 is positioned in the upper portion of cartridge outer passageway 20 and performs a filtration function, collecting particulates and oil.

Body assembly 14 forms a top mounting surface 57 for mating with load plate surface 35. Body assembly 14 further defines supply port 58 which receives compressed air from the system air compressor (not shown). Control port 60 receives a compressor control air signal which actuates the system compressor to cycle between a loaded mode producing compressed air and an unloaded mode. Delivery port 62 discharges de-watered compressed air. Purge valve assembly 64 is positioned within purge port 66 in the bottom surface of body casting 68 and communicates with supply port 58 and control port 60.

Body casting 68 defines three separate concentric internal cavities. Outer cavity 70 in the form of a perimeter groove is positioned between O-rings 50 and 52, and opens between the O-rings. Intermediate cavity 72 surrounds up-standing central boss 74 which is hollow, defining central passage 76. A radially drilled bore 78 communicates central passage 76 with delivery port 62, having check valve 80 installed therein. A small orifice 82 communicates intermediate cavity 72 with bore 78.

Cartridge 12 and body assembly 14 are fastened together by tightening bolt 84 having threaded end 85. The action of torquing bolt 84 pulls cartridge 12 and body assembly 14 tightly together with their mating surfaces 35 and 57 in sealing engagement. Cartridge 12 is prevented from rotating by interlocking between tabs 86 and features on body casting 68. Snap ring 88 installed on bolt 84 serves a retention function which will be explained later. Bolt 84 further features driving head 90 which can be engaged by a wrench or socket. When cartridge 12 is mounted, compression of O-rings 50, 52 and 54 creates distinct chambers, each partly comprised by cartridge 12 and body assembly 14. Specifically, body outer cavity 70 communicates with cartridge outer passageway 20, lower body intermediate cavity 72 communicates with cartridge annular interior cavity 22, and desiccant bed 24 communicates with central passage 76.

Operation of air dryer 10 will now be described. In the loaded mode, the system compressor supplies high pressure air to supply port 58. This air passes through purge valve assembly 64 and into body outer cavity 70 and into cartridge outer passageway 20. Air thus flows upwardly through filter 56 where particulate contaminants and oil are stripped from the air flow. Air then passes to the top of outer shell 16 and downwardly through desiccant bed 24 which strips water from the compressed air. Tile dry air then passes around threaded boss 44, through apertures 46 and into body central passage 76. The clean dry air then exits through check valve 80 and delivery port 62. During the compressor loaded mode, this high pressure air is allowed to flow through orifice 82 into an integral purge volume defined by body intermediate cavity 72 and cartridge inner sleeve annular interior cavity 22. Thus, this purge volume reaches the pressure of air flowing from delivery port 62.

In operation of air dryer 10 in a vehicle air supply system, once the pressure in the system's reservoir (not shown) has reached a set point, a high pressure air signal is sent to a compressor control port causing it to cycle to the unloaded mode and to air dryer control port 60. An internal diaphragm within purge valve assembly 64 closes supply port 58 and opens body outer chamber 70 to atmosphere through purge port 66. Air cannot escape the unit through delivery port 62 due to the action of check valve 80. When this occurs, the compressed air stored within the purge volume slowly leaks from orifice 82 toward purge valve assembly 64, generating a reverse air flow upwardly through body central passage 76 and desiccant bed 24. This reverse purging air flow causes water to be stripped from the desiccant bed as well as some oil and solid contaminants from filter 56 which are expelled through purge valve assembly 64.

A principal feature of the present invention is the convenient manner of attachment of desiccant cartridge 12 to body assembly 14. FIG. 2 illustrates the fully assembled configuration of air dryer 10. When it is desired to remove desiccant cartridge 12, retention bolt driving head 90 is accessed using a conventional hex socket. Driving head 90 is externally accessible at the exposed bottom surface of body assembly 14. Unthreading of bolt 84 occurs while interlocking between tabs 86 and body casting 68 prevent relative rotation between the cartridge and body assembly. Once bolt 84 is entirely unthreaded from boss 44, the bolt drops down with snap ring 88 preventing the bolt from falling completely out of the body assembly, keeping it from becoming lost if it were allowed to fall out. Desiccant cartridge 12 is then simply lifted off the mounting surface 57 of body assembly 14 and replaced with a new or refurbished cartridge. The new cartridge is indexed to interlock tabs 86 with body casting 68. Thereafter, bolt 84 is meshed with threaded boss 44 and the bolt is tightened.

The attachment system provided by air dryer 10 for desiccant cartridge 12 facilitates access in tight packaging installations. No tools are required to engage desiccant cartridge 12 such as conventional band type canister removal tools which require significant access area for use. Since air lines are connected with ports 58, 60 and 62 in body assembly 14, that area is relatively unobstructed in normal installations, consequently providing access of a tool to bolt driving head 90.

It is to be understood that the invention is not limited to the exact construction illustrated and described above, but that various changes and modifications may be made without departing from the spirit and scope of the invention as defined in the following claims.

We claim:

1. An air dryer assembly for a motor vehicle air supply system, comprising:

a cartridge having a cup shaped outer shell, said outer shell affixed to a load plate having air flow passages therethrough, said load plate having a mounting surface with a first threaded means, said cartridge having a desiccant material therein for removing water from air passing through said air supply system, a body assembly having a plurality of ports for connection with said air supply system and a mounting surface enabling said cartridge load plate mounting surface to be mated thereto, whereby said cartridge and said body assembly cooperate to form air flow passageways for said air passing through said body assembly ports and a through bore opening in said body mounting surface and in an exposed opposing surface of said body assembly, said through bore being aligned with said cartridge load plate first threaded means when said cartridge and said body assembly are mated together at said mounting surfaces, and a retention bolt positioned through said body assembly bore and having second threaded means engaging said cartridge load plate first threaded means thereby fastening together said cartridge and said load plate assembly, said retention bolt having a driving head accessible at said body exposed surface.

2. An air dryer system according to claim 1 further comprising, said cartridge and said body assembly having interlocking means for preventing relative rotation between said cartridge and said body assembly.

3. An air dryer system according to claim 2 wherein said interlocking means comprises at least one tab projecting from said cartridge load plate engaging a recess formed by said body assembly.

4. An air dryer according to claim 1 wherein said cartridge is mounted above said body assembly with said load plate defining the bottom surface of said cartridge and said body mounting surface defining a top surface of said body assembly.

5. An air dryer according to claim 1 wherein said retention bolt further having means for restricting removal of said bolt from said through bore when said cartridge is dismounted from said body assembly.

6. An air dryer according to claim 1 wherein said body assembly through bore further defines an air flow passage within said body assembly.

7. An air dryer according to claim 1 wherein said cartridge load plate first threaded means comprises a threaded bore, and said retention bolt second threaded means comprises an externally threaded end of said bolt.

* * * * *